(12) United States Patent
Newell et al.

(10) Patent No.: US 7,099,334 B2
(45) Date of Patent: Aug. 29, 2006

(54) ATM OVER MPLS CONNECTION ESTABLISHMENT MECHANISM

(75) Inventors: Darren L. Newell, Kanata (CA);
Sandra S. Ballarte, Kanata (CA);
Kasper K. Reinink, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 920 days.

(21) Appl. No.: 10/028,791

(22) Filed: Dec. 28, 2001

(65) Prior Publication Data

US 2002/0143849 A1    Oct. 3, 2002

Related U.S. Application Data

(60) Provisional application No. 60/279,901, filed on Mar. 29, 2001.

(51) Int. Cl.
*H04L 12/56* (2006.01)

(52) U.S. Cl. .................. 370/395.5; 370/395.3

(58) Field of Classification Search ................ 370/469, 370/395.2, 395.5, 395.6, 351, 396, 395.21
See application file for complete search history.

(56) References Cited

U.S. PATENT DOCUMENTS

| | | | |
|---|---|---|---|
| 6,341,127 B1 * | 1/2002 | Katsube et al. | 370/352 |
| 6,374,303 B1 * | 4/2002 | Armitage et al. | 709/242 |
| 6,594,260 B1 * | 7/2003 | Aviani et al. | 370/389 |
| 6,680,943 B1 * | 1/2004 | Gibson et al. | 370/392 |
| 6,879,594 B1 * | 4/2005 | Lee et al. | 370/408 |
| 2002/0136226 A1 * | 9/2002 | Ho | 370/395.51 |

FOREIGN PATENT DOCUMENTS

WO    WO 00 36871 A    6/2000

OTHER PUBLICATIONS

Cisco MPLS Controller Software Configuration Guide Release 9.3.0 Apr. 2000.*
Holness F. et al "Multiprotocol Label Switching Within the Core Network", 38th European Telecommunications Congress. Proceedings Networking the Future. Utrecht, NL Aug. 24-28, 1999 pp. 97-100.
Tai Won Um et al "A Study on Interworking Scenarios Between ATM-Based MPLS Network and IPOA/Lane Network", — Proceedings of the IEEE Conference 2000 on High Performance Switching and Routing. Heidelberg, Germany, Jun. 26-29, 2000 Proceedings of the IEEE Conference on High Performance Switching and Routing, New York, NY IEEE, US, Jun. 26, 2000, pp. 275-800.

* cited by examiner

*Primary Examiner*—Hassan Kizou
*Assistant Examiner*—Salman Ahmed
(74) *Attorney, Agent, or Firm*—Jeffrey M. Measures; Borden Ladner Gervais LLP (57) ABSTRACT

Methods and apparatus for establishing connections between network nodes across an MPLS domain. A data receive node transmits to a data transmit node the service label that the data receive node expects to receive embedded in packets originating from the data transmit node. Any packet that has this service label by the data receive node will therefore be treated and considered by this data receive node as originating from the data transmit node.

11 Claims, 8 Drawing Sheets

FIG. 1

| BITS | | | | | | | | OCTET(S) |
|---|---|---|---|---|---|---|---|---|
| 1 | 2 | 3 | 4 | 5 | 6 | 7 | 8 | |
| GENERIC IDENTIFIER TRANSPORT INFORMATION ELEMENT | | | | | | | | 1 |
| 0 | 1 | 1 | 1 | 1 | 1 | 1 | 1 | |
| INFORMATION ELEMENT IDENTIFIER | | | | | | | | |
| 1 | CODING | INFORMATION ELEMENT INSTRUCTION FIELD | | | | | | 2 |
| EXT | STANDARD | FLAG | RESERV | INFORMATION ELEMENT ACTION IND | | | | |
| LENGTH OF GENERIC IDENTIFIER TRANSPORT INFORMATION ELEMENTS CONTENTS | | | | | | | | 3 |
| LENGTH OF GENERIC IDENTIFIER TRANSPORT INFORMATION ELEMENTS CONTENTS(CONTINUED) | | | | | | | | 4 |
| 0 | 0 | 0 | 0 | 0 | 0 | 1 | 1 | 5 |
| IDENTIFIER RELATED STANDARD/APPLICATIONS (VENDOR SPECIFIC) | | | | | | | | |
| 0 | 0 | 0 | 0 | 0 | 1 | 0 | 1 | 6 |
| IDENTIFIER TYPE (TRANSPORT IDENTIFIER) | | | | | | | | |
| IDENTIFIER LENGTH | | | | | | | | 6.1 |
| IDENTIFIER VALUE | | | | | | | | 6.2 TO 6.m |
| IDENTIFIER TYPE | | | | | | | | N |
| IDENTIFIER LENGTH | | | | | | | | N.1 |
| IDENTIFIER VALUE | | | | | | | | N.2 TO N.m |

ATM OVER MPLS CONNECTION ESTABLISHMENT MECHANISM

This application relates to U.S. Provisional Patent Application 60/279,901 filed Mar. 29, 2001.

FIELD OF THE INVENTION

The present invention relates to data network transmissions and, more particularly, to methods and apparatus for implementing ATM (asynchronous transfer mode) connections over domains implementing MPLS (multiprotocol label switching) standards.

BACKGROUND TO THE INVENTION

The field of data networking is continuously evolving and part of this evolution is the emergence of new standards, protocols, and technologies. As an example, ATM technology, now widely used in many networks, was developed over the past decade to overcome specific drawbacks of the then existing networking technology. One consequence of this continuous development is the need to adapt existing technologies with the newly developed protocols and standards.

One of these newly developed technologies is the MPLS standard. In an MPLS network, incoming packets are assigned a label by a label edge router (LER). Packets are forwarded along a label switch path (LSP) where each label switch router (LSR) makes forwarding decisions based solely on the contents of a label. At each hop, the LSR strips off the existing label and applies a new label. This new label then informs the next hop how to forward the packet. This technology, among other benefits, allows routers to make forwarding decisions based on the contents of a simple label rather than by performing complex route lookup operations.

While the MPLS standard holds out much promise, ATM technology needs to be adapted to the MPLS standard so that the benefits of MPLS technology can be added to the benefits of ATM technology. ATM technology provides access to a network by multiplexing user information into fixed length units or cells. Using ATM technology, networks today can establish dedicated links between nodes. These links can be created as needed and can create high-throughput connections between nodes. Currently, there are no call control procedures for the establishment and clearing of ATM on-demand connections over MPLS.

As noted above, an MPLS network consists of MPLS switches serving as LERs and LSRS and provides connection services for the establishment of MPLS connections. To establish on-demand ATM connections, ATM connection information needs to be exchanged between its call control peers or between two communicating ATM nodes. In ATM networks, ATM signalling protocols are used to exchange ATM connection information between call control peers or nodes.

One major feature of MPLS is the unidirectional nature of its connections. Forwarding of a traffic flow is determined by the label attached to a data transfer unit. Since label assignment in one direction is not associated with the reverse direction, there is no indication as to the original source of the data transfer unit. A destination node therefore cannot be determined from where traffic flow originated. Also, since in a uni-directional system the routing is label based, a route used by one data transfer unit may be different from a route used by a second data transfer unit even if both data transfer units originated from the same source and are heading to the same destination. This feature of the MPLS standard renders it quite difficult to set up an ATM style connection between two nodes. Furthermore, this feature renders any "link" between nodes across an MPLS domain as a unidirectional link. Coordinating control signals between two nodes is, again, rendered difficult.

From the above, what is therefore required is a solution which will allow ATM connections to be established across domains implementing the MPLS standard.

It should be noted that the term data transmission unit (DTU) will be used in a generic sense throughout this document to mean units through which digital data is transmitted from one point in a network to another. Thus, such units may take the form of packets, cells, frames, or any other unit as long as digital data is encapsulated within the unit. Thus, the term DTU is applicable to any and all packets and frames that implement specific protocols, standards or transmission schemes. It should also be noted that the term digital data will be used throughout this document to encompass all manner of voice, multimedia content, video, binary data or any other form of data or information that has been digitized and that is transmitted from one point in a network to another as a payload of a data transmission unit.

SUMMARY OF THE INVENTION

The present invention meets the above need by providing methods and apparatus for establishing connections between network nodes across an MPLS domain. A data receive node transmits to a data transmit node the service label that the data receive node expects to receive embedded in data transfer units originating from the data transmit node. Any DTU that has this service label and is received by the data receive node will therefore be treated and considered by this data receive node as originating from the data transmit node.

In one aspect, the present invention provides a method of establishing a bi-directional data transfer connection between a first node and a second node across a domain which only allows unidirectional data flow, the method comprising:

a) sending a setup message from the first node to the second node, said setup message containing a first connection service label for a backward direction of data flow, said backward direction being from said second node to said first node;

b) receiving said setup message at said second node and reserving said first connection service label for digital data being sent from said second node to said first node;

c) sending a response message from the second node to the first node, said response message containing a second connection service label for a forward direction of data flow, said forward direction being from said first node to said second node; and d) receiving said response message at said first node and reserving said second connection service label for data being sent from said first node to said second node, wherein for forward data transmission in said forward direction, data transfer unit for said forward data transmission will be labelled with said second connection service label and for a backward data transmission in said backward direction, data transfer units for said backward data transmission will be labelled with said first connection service label.

In a second aspect, the present invention provides a setup message sent from a first node to a second node for establishing a data transfer connection across a domain which only allows unidirectional data flow, said setup message containing a connection service label to be used by said second node when transmitting digital data to said first node on said data transfer connection.

In a third aspect, the present invention provides a response message sent in response to a setup message from a first node establishing a data transfer connection across a domain which only allows unidirectional data flow, said response message being sent from a second node to said first node and containing a connection service label to be used by said first node when transmitting data to said second node on said data transfer connection.

In a fourth aspect, the present invention provides a data transfer unit being sent from a transmitting node to a receiving node, said data transfer unit having a service label indicating a processing context that determines how said unit is to be processed by said receiving node, said unit being used in a unidirectional data transfer connection and said service label being determined by said receiving node.

In a fifth aspect, the present invention provides a first network switch for bridging between a first domain which only allows unidirectional flow and a second domain, the first switch including:
 a first module for transmitting or receiving first data transmission units to or from the second domain;
 a second module for transmitting or receiving second data transmission units to or from the first domain;
 a switch core module placed between the first and second modules for switching data between the first and second modules,
wherein the first network switch executes computer readable and computer executable instructions for implementing a method for establishing a data transfer connection between the first network switch and a second network switch across the first domain, the method including:
 a) sending a setup message from the first network switch to the second network switch, said setup message containing a first connection service label for a backward direction of data flow, said backward direction being from said second network switch to said first network switch;
 b) receiving a response message from the second network switch, the response message containing a second connection service label for a forward direction of data flow, the forward direction being from the second switch to the first switch and reserving said second connection service label for data being sent from said first switch to said second switch,
such that
for forward data transmission in said forward direction, data packets for said forward data transmission will be labelled with said second connection service label and for a backward data transmission in said backward direction, data packets for said backward data transmission will be labelled with said first connection service label.

BRIEF DESCRIPTION OF THE DRAWINGS

A better understanding of the invention may be obtained by reading the detailed description of the invention below, in conjunction with the following drawings, in which.

DETAILED DESCRIPTION

Figure 1:
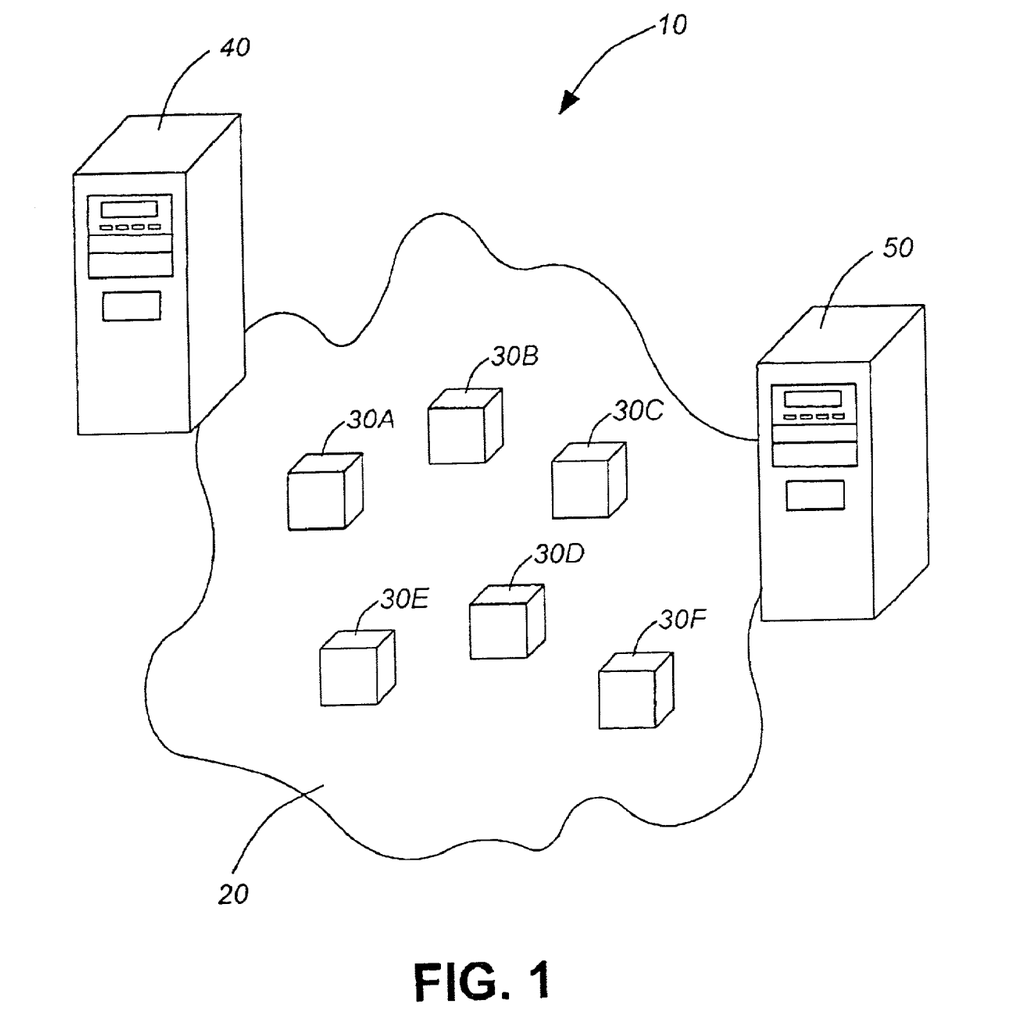
FIG. 1 illustrates a topology of an MPLS domain.

Referring to FIG. 1, a topology 10 of an MPLS domain 20 is illustrated. As can be seen, MPLS nodes 30A, 30B, 30C, 30D, 30E, and 30F are illustrated. Also illustrated in FIG. 1 are a first ATM node 40 and a second ATM node 50. Both the first ATM node 40 and the second ATM node 50 are located on the edges of an MPLS domain occupied by MPLS nodes 30A, 30B, 30C, 40D, 30E and 30F.

Any one of the MPLS nodes can receive a DTU and route that DTU based solely on a transport label within the DTU. As example, if MPLS node 30A receives a DTU with transport label A1, node 30A may route that DTU to MPLS node 30E based on the transport label A1. MPLS node 30A may also strip that transport label A1 off the DTU and replace it with a different transport label prior to transmitting the DTU to the next MPLS node. Because of the forward passing or hopping of DTUS based on transport labels that may be changed or deleted by the MPLS nodes, the origin of a DTU may be lost after a few hops.

Difficulties may occur if the first ATM node 40 wishes to establish a data link or a connection to the second ATM node 50. Part of the ATM standard is the ability to designate, when required, dedicated data channels between ATM nodes. Such dedicated data channels would therefore be reserved for digital data traffic between two specific nodes in a virtual channel connection or in a virtual path between the 2 nodes. These channels are not necessarily point-to-point physical links between the ATM nodes in question but may be "virtual" channels that only route data between the two ATM nodes in question. Thus, a virtual channel connection (VCC), a concatenation of virtual channel links that extends between two ATM nodes, can be created between the ATM nodes. Such a channel may be classified as a data tunnel, defined as a secure, virtual point-to-point link that connects two ATM nodes and transfers a payload between the two nodes with the payload, including service labels, not being modifiable by intervening nodes. The transmission of DTUS through these channels is assisted by virtual path identifiers (VPI) or by virtual channel identifiers (VCI).

To connect the ATM nodes 40 and 50 with a temporary channel, known as a switched virtual channel (SVC), or a permanent channel, known as a permanent virtual channel (PVC), the connection to which DTUS belong must be known at each out of a channel. This information must accompany each data transmission through the channel so that the digital data in the transmission be processed accordingly. The processing of DTUS at each end of a channel usually depends on the specific characteristics or configuration of the channel. As an example, DTUS for channel x between ATM nodes A and ATM node B may need to be processed in a specific certain manner that is different from the processing that DTUS for channel y between the same two nodes receive. Typically, however, the channel configuration involves the processing of the DTUS after they pass through the ATM channels. Thus, DTUS in channel x from node A to node B may need to be forwarded to node Q after they exit node B. Similarly, DTUS in channel y, as between the same two nodes A and B, may need to be forwarded to node R after exiting node B.

A solution to the above issue is that of using an immutable or unchangeable service label between the two ATM nodes for a specific connection or channel. This is done by having a receive ATM node (a node receiving data) define a service label that it will expect from a transmit ATM node (a node transmitting data) for that connection. This service label is then sent to the transmit ATM node. Once received, the transmit ATM node will reserve that service label for any DTUS that need to be transmitted to the receive ATM node on that connection. Thus, any DTUS heading for the receive ATM node on the specific connection will have that service label. At the other end of the virtual channel, any DTUS received by the ATM receive node which has that service label will be considered to be for that specific connection and will be processed accordingly. This scheme avoids the need to encode an origin address for a DTU as connection context is implicitly defined by the service label of a DTU.

One other advantage to the above scheme relates to the unchanging nature of service labels in MPLS technology. Since service labels are not within the purview of MPLS LSR (label switched routers) nodes in terms of routing, they remain the same no matter how many changes are made to a DTU transport label. Thus, using the nodes in FIG. 1, if service label A1 is associated with connection A, between node 40 and node 50, any data packets passing through that connection through the MPLS domain 20 will have that service label. In travelling through the MPLS domain 20, any of the MPLS nodes 30A . . . 30F may remove, replace, or add to the transport label(s) used by the data packets. However, these MPLS nodes, since they are label switched routers (LSRS), cannot change the service label assigned to the data packets. The service label therefore provides an immutable connection identifier for data packets as they travel through an MPLS domain.

It should be clear that, given the unidirectional nature of MPLS routing, two service labels will need to be exchanged between any two ATM nodes wishing to establish a bidirectional data connection. One service label will therefore serve as the service label for data being transmitted from node A to node B. Another service label will serve as the service label for data going in the opposite direction or from node B to node A.

One possible issue regarding the above service label concept is that of routing a setup or initialize DTU between a receive ATM node and a transmit ATM node. The setup DTU would setup one unidirectional channel between the receive ATM node and the transmit ATM node. A response DTU, sent in response to the setup DTU, not only acknowledges the setup DTU but also sets up another unidirectional channel between the receive ATM node and the transmit ATM node. Clearly, these two unidirectional channels between the two ATM nodes transmit data in opposite directions and effectively form a single bidirectional channel. The routing of both the setup and response DTUS is effected by using dedicated control channels between the two ATM nodes. These channels can be set up when the network is engineered or created. Specific service labels are set aside for each unidirectional control channel between ATM nodes.

Figure 1A:
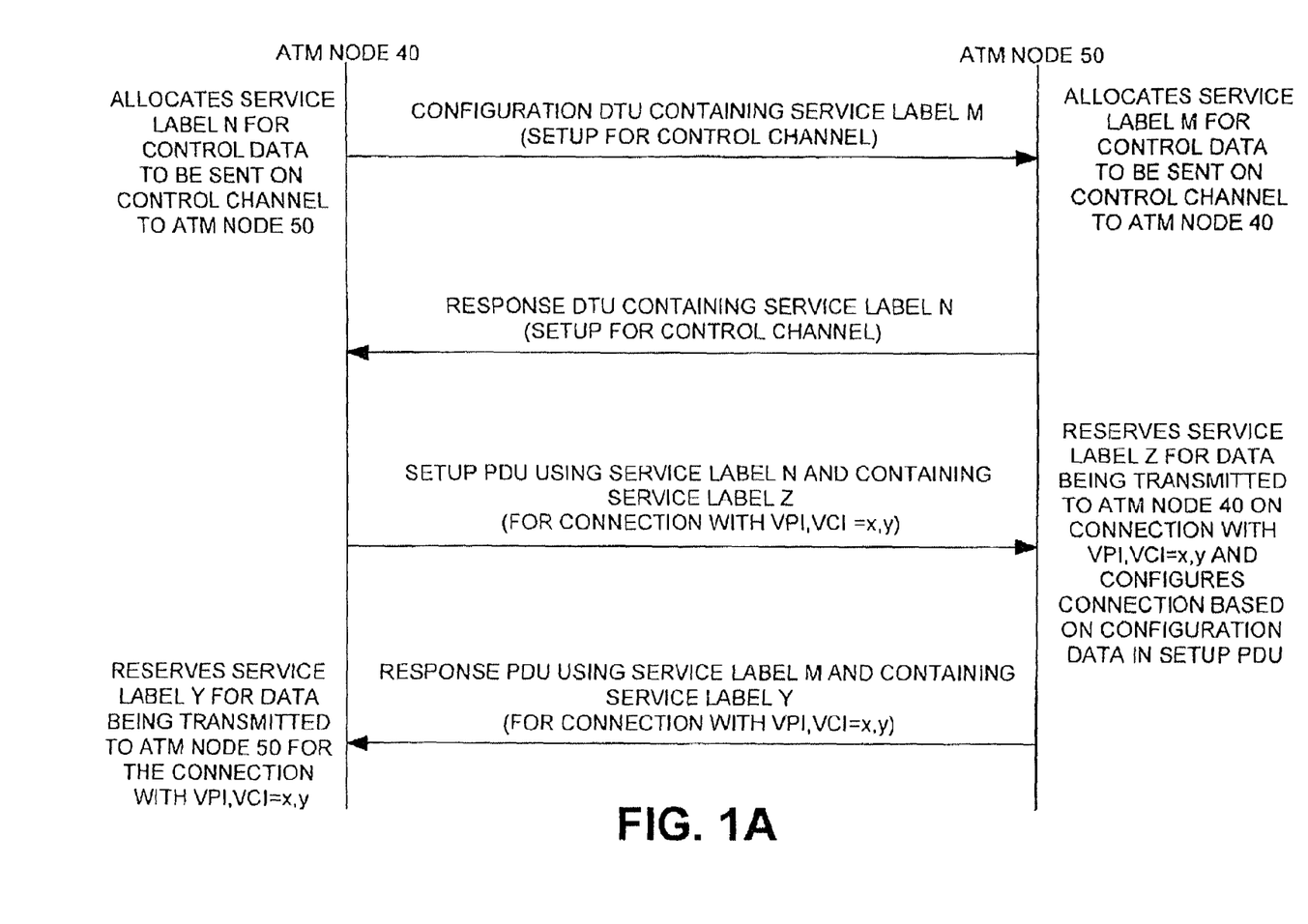
FIG. 1A is a data flow diagram illustrating the exchange of data and DTUS between two ATM nodes establishing a connection across an MPLS domain.

Using ATM nodes 40 and 50 in FIG. 1, FIG. 1A illustrates the data flow and exchange of DTUS and PDUs (Protocol Data Units) between two ATM nodes across an MPLS domain. Each vertical line FIG. 1A denotes an ATM nodes which each horizontal line denotes data flow or the transmission of a specific DTU or PDU between the two ATM nodes. Also noted in FIG. 1A are the actions taken by each ATM node as it receives a new DTU from the other nodes. If ATM node 40 at the inception of the network needs to set up a control channel with ATM node 50, ATM node 40 sends a configuration DTU to ATM node 50 containing service label M. ATM node 50, once it receives the configuration DTU, allocates service label M as being for control data on the control channel transmitting to ATM node 40. ATM node 50 also creates a configuring response DTU containing service label N for transmission to ATM node 40. When ATM node 40 receives this configuration response DTU, ATM node 40 reserves service label N for control data on the control channel transmitting to ATM node 50.

By the above method, a bidirectional control channel between ATM node 40 and ATM node 50 is created. Control DTUS from ATM node 40 going to ATM node 50 will have service label N while control DTUS from ATM node 50 to ATM node 40 will have service label M. Thus, to set up a connection between these two ATM nodes, one ATM node will initiate the process by sending a setup DTU containing a service label for use by the connection in the reverse direction (from node 50 to node 40) to the other ATM node using the control channel and the relevant service label N. This sets up one unidirectional connection channel. The other ATM node, in response to this setup DTU, will then send a response DTU containing a service label for use by the convection in the forward direction (from node 40 to node 50) to set up the other unidirectional connection channel using the control channel and relevant service label M.

With control channels and control service labels established between ATM nodes, control signals can be passed between ATM nodes and virtual channels, either SVCs or PVCs, can be set up between them. The process proceeds as such: ATM node 40 desires a channel for a specific connection with ATM node 50. ATM node 40 thus sends a setup PDU (protocol data unit), or a setup DTU, to ATM node 50 with a predetermined service label N reserved for control DTUS. It is assumed that service label N is preassigned to the control channel flowing from the ATM node 40 to the ATM node 50. Contained within the setup PDU as part of its payload is a service label Z that ATM node 40 wishes to use for the virtual connection where VPI.VCI=x.y between itself and ATM node 50. This service label Z is thus to be used for data flowing from ATM node 50 to ATM node 40 for virtual connection x.y.

Once the setup PDU is transmitted from ATM node 40, it then traverses the MPLS domain, during which the setup PDU may or may not undergo numerous changes in its transport label. Once the setup PDU arrives at ATM node 50, this node checks the service label associated with the setup PDU and determines that, since service label N is used, the setup PDU is a control DTU. After further processing, ATM node 50 determines that ATM node 40 wishes to establish a data transfer connection labelled x.y and that service label Z is to be used for this connection. ATM node 50 thus reserves this service label Z for any data or connection x.y flowing from itself to ATM node 40. Depending on the type of connection desired by ATM node 40 the setup packet will also have configuration data for the connection. Parameters and configuration information such as the processing that DTUS on this connection will receive and the end destination of such DTUS may be in the setup DTU. ATM node 50 will thus reserve resources for the expected data transfer connection based on configuration information contained in the control packet.

With resources allocated, ATM node 50 then creates a response PDU and associates with this response PDU the predetermined service label M. Again, it is assumed that service label M is preassigned to the control or channel flowing from ATM node 50 to ATM node 40. As part of the payload for this response PDU, a service label Y is designated by ATM node 50 as the service label to be used for the data transfer connection labelled x.y for data flow from ATM node 40 to ATM node 50 on this connection. This response PDU is then transmitted to the ATM node 40. It should be noted that the response PDU is also a control DTU but is created and sent in response to a setup PDU.

Once the ATM node 40 receives the response PDU from the ATM node 50, ATM node 40 then reserves the service label Y as the service label for data received from ATM node 50 for that particular connection x.y. Data can now be exchanged between ATM nodes 40 and 50 for connection x.y. For data flowing from ATM node 40 to ATM node 50, connection x.y DTUS will use service label Y while data flowing from ATM node 50 to ATM node 40, connection x.y DTUS will use service label Z.

While the above example uses a response PDU to transmit service label Y from ATM node 50 to ATM node 40, not all response PDUs need to carry such a service label. A response PDU may have a different function from that of merely delivering the service label. Although this function of delivering the relevant service label is a primary function of the response PDU, the response PDU can be used to, among other functions, alert the other ATM node that the setup PDU has been received or alert the other ATM node that the relevant service label is on its way, or that the setup PDU is being processed. As such, the response PDU may alert the other ATM node that the timer on the other ATM node should be extended to prevent a time-out condition. As long as the important function of delivering the service label is performed by a subsequent response PDU, the preceding response PDUs may perform other functions related to the setup PDU such as the alerting function explained above.

As the payload for either the setup PDU or the response PDU, a generic identifier transport information element (GIT IE) may be used to identify the service labels to be used. Such a GIT IE may have a format as illustrated in FIG. 2.

Figure 2:
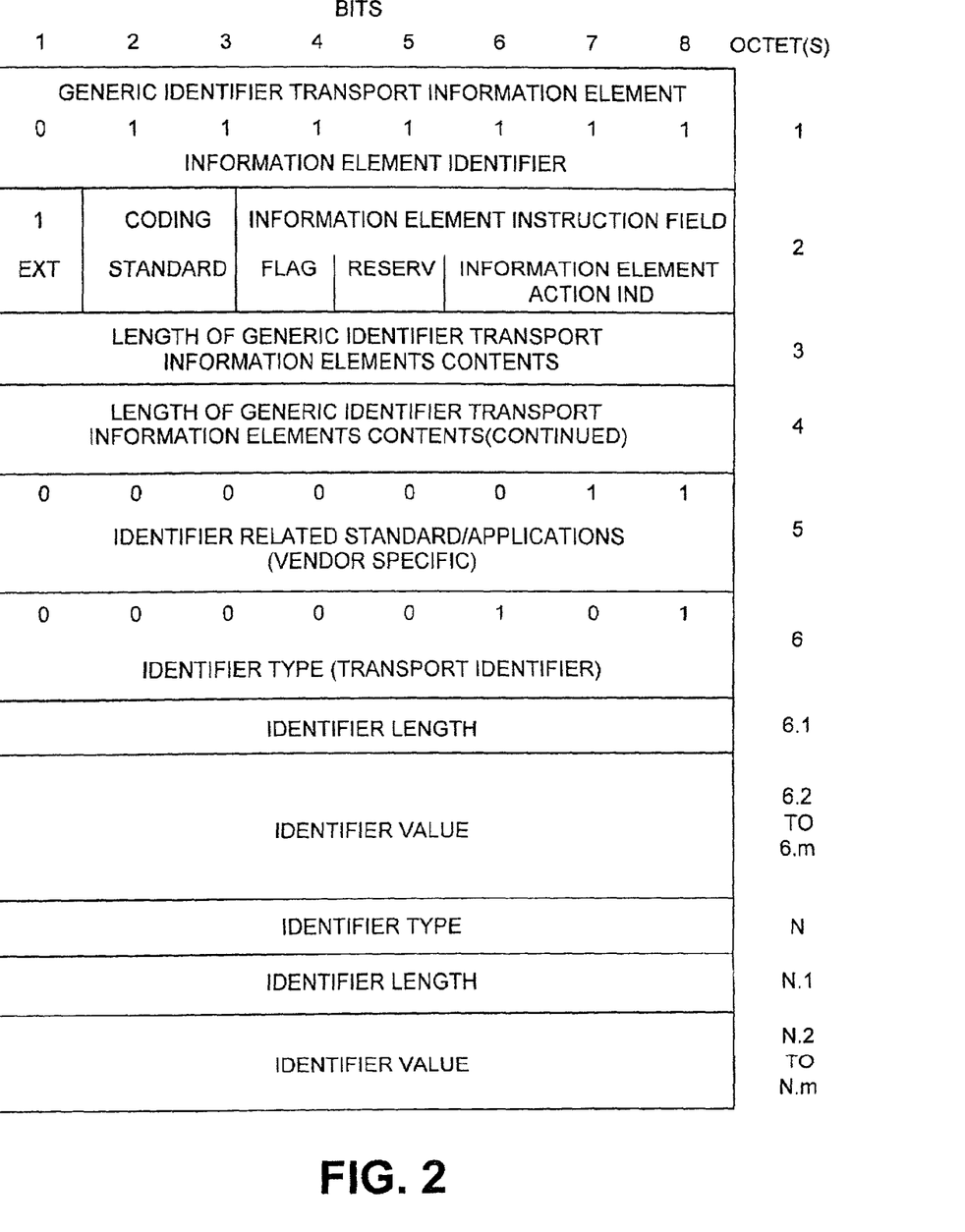
FIG. 2 illustrates a possible format for a generic identifier transport information element.
Figure 3:
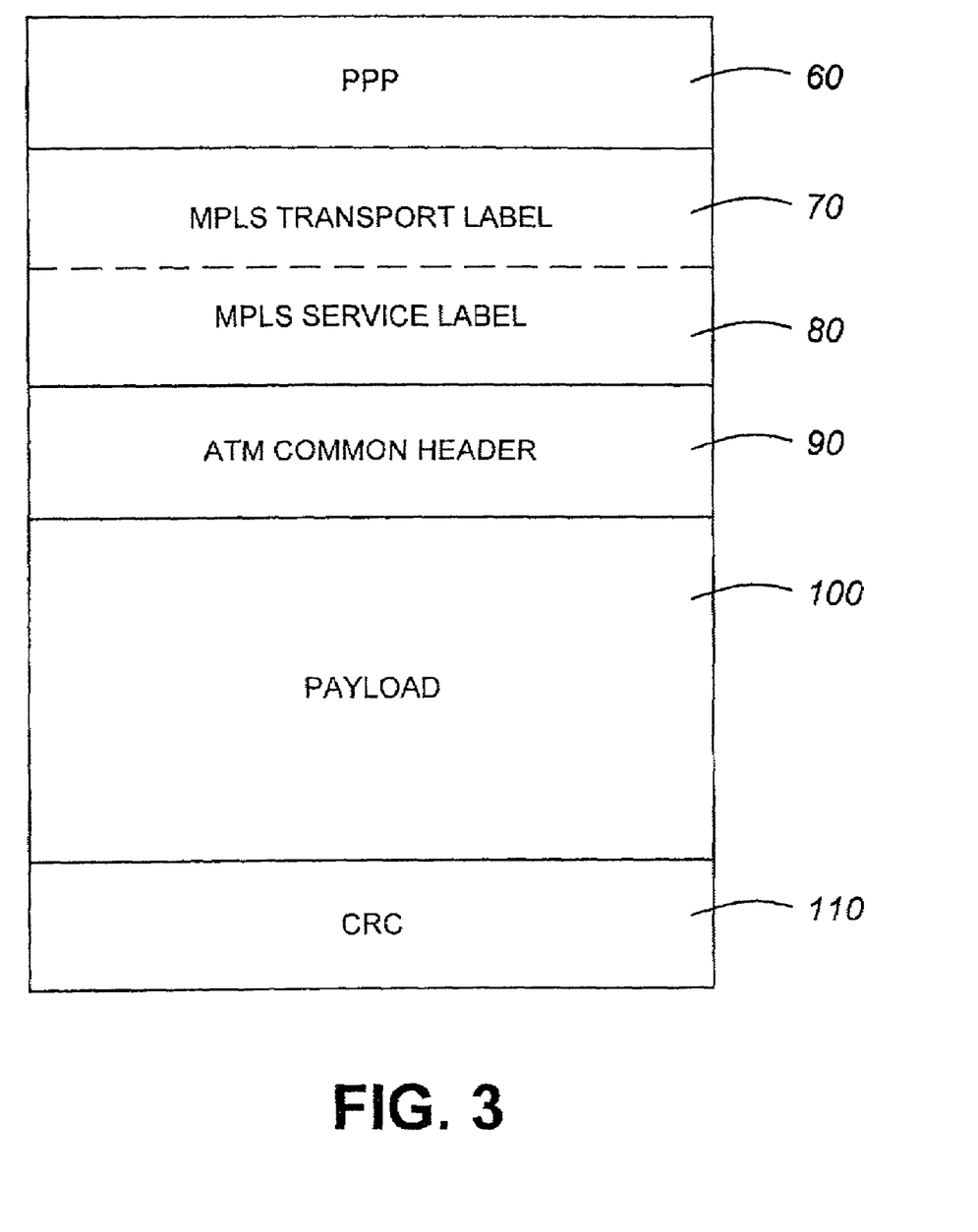
FIG. 3 is a possible format for a packet implementing ATM protocols over an MPLS frame.

To signify that MPLS service label data is being transported by the GIT IE, the Identifier Type field in the format illustrated in FIG. 2 can be given a specific value such as 5. The service label data being transported can then be stored in the Identifier Value field. The length or size in bytes of this service label data can then be stored in the Identifier Length field. The Identifier Related Application field can be user or vendor specific. As an example, an equipment manufacturer may wish to use a value of 3 for the Identifier Related Application field to denote a specific product line such that an ATM switch implementing the invention can recognize setup PDUs originating from compatible equipment. ATM protocols may be implemented over MPLS frames by using the format as illustrated in FIG. 3. As can be seen from FIG. 3, a PPP (point to point protocol) field 60 provides for data related to the PPP protocol while a transport label field 70 and a service label field 80 allow for the use of the packet over an MPLS domain. An ATM common header field 90 provides space for ATM related data while the payload 100 contains the data to be transported. A CRC (cyclic redundancy check) field 110 provides error correction for the DTU.

Figure 4:
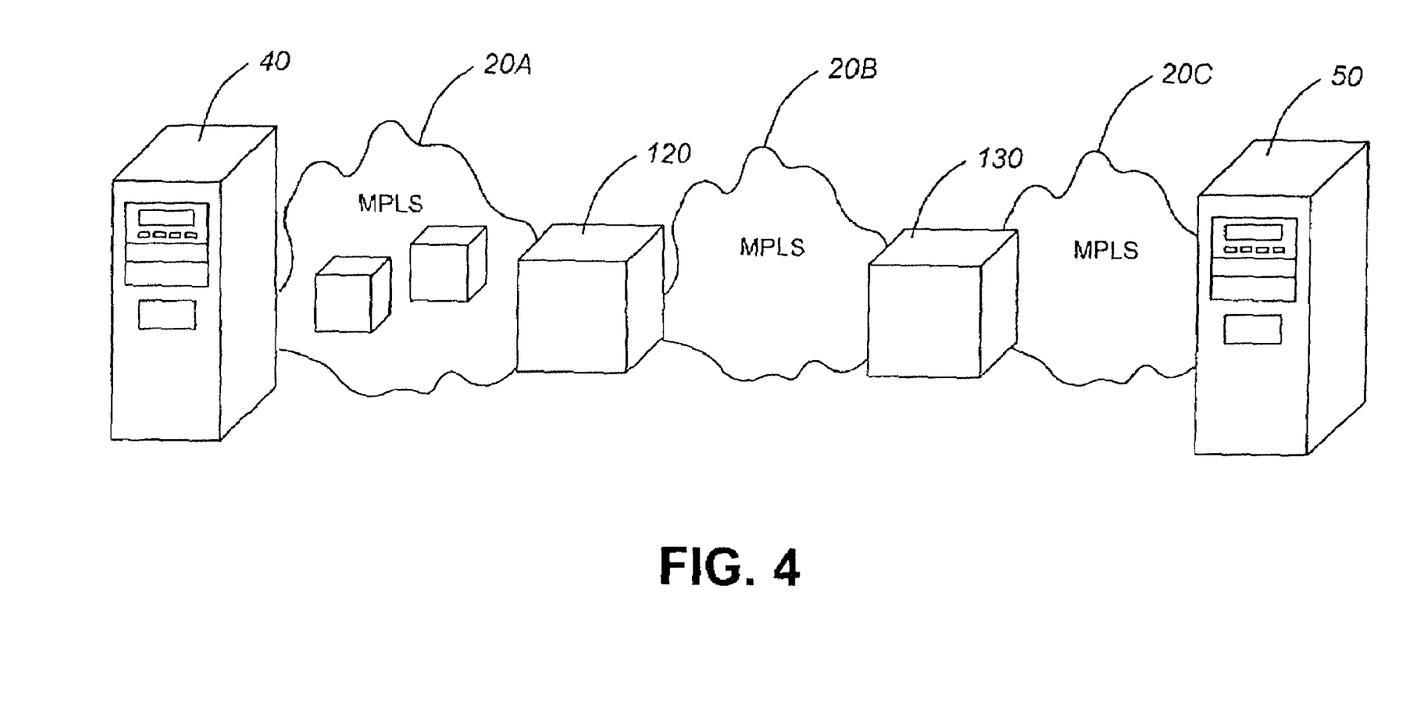
FIG. 4 illustrates topology having multiple MPLS domains.

It should be noted that the scheme explained above can be used for ATM nodes that may be separated by multiple MPLS domains. FIG. 4 illustrates such a topology. In FIG. 4, ATM nodes 40 and 50 are separated by MPLS domains 20A, 20B, 20C. Domains 20A and 20B are bridged by a bridge server 120 while domains 20B and 20C are bridged by bridge server 130. ATM node 40 is connected to MPLS domain 20A while ATM node 50 is connected to MPLS domain 20C. Once a connection is established between the two ATM nodes, the service labels they have reserved for each other are inviolate relative to the MPLS domains. A DTU travelling from ATM node 40 to ATM node 50 may undergo numerous changes in transport labels or transport labels may be stacked within that DTU but this does not change the service label associated with it. Thus, regardless of how many MPLS domains a DTU may traverse, and regardless of its routing, when that DTU is received by ATM node 50, that DTU will be processed in accordance with its specific connection configuration.

FIG. 4 also highlights another advantage of the transport label system explained above. Simply put, a single transport label can be used to route a DTU from its origin node to its destination node and provides a peering relationship between ATM nodes for routing through MPLS domains. While the illustration in FIG. 3 shows only one MPLS transport label field 70, this field can be used to "stack" multiple transport labels. Thus, referring to FIG. 4, ATM node 40 can add an initial transport label TL1 to the transport label field of a DTU designating ATM node 50 as the destination. When the DTU traverses MPLS domains 20A, 20B, 20C other transport labels can be added or deleted as required to the transport label field without affecting or modifying the initial transport label TL1. Thus, the DTU may have transport label TLA added to the transport label field for traversing MPLS domain 20A. The ATM node 40 can, in addition to the initial transport label TL1, add transport label TLA to the transport label field. The transport label TLA will route the DTU from ATM node 40 to bridge server 120. At bridge sever 120, transport label TLA is removed and replaced by transport label TLB without affecting the initial transport label TL1. Transport label TLB will then route the DTU to bridge server 130. Then, bridge server 130 will remove transport label TLB and replace this with transport label TLC, again without affecting the initial transport label TL1. Transport label TLC will route the DTU from bridge server 130 to the ATM node 50.

While the above explanation and example notes the replacement of interim transport labels at the bridge servers 120, 130 further interim transport labels may be added and deleted from the DTU when the DTU is traversing any of the domains. Interim transport label TLA-1 may thus be added to the transport label field of the DTU when the DTU is traversing MPLS domain 20A and without affecting either transport label TLA or the initial transport label TL1. This interim transport label TLA-1 may then be removed from the transport label field of the DTU when the interim transport label is no longer required. Other transport labels may thus be added or deleted without affecting the previous transport labels. In this reuse, transport labels are added and discarded in a manner similar to that of a last-in first-out (LIFO) stack—the most recently added transport labels are the first transport labels to be discarded.

The above scheme of a single transport label used for routing DTUS between peer or similar nodes, such as two ATM nodes, allows for simplicity and low overhead when transmitting digital data between peer nodes. The scheme may also be used to differentiate between traffic classes in traffic between two nodes. From the above example, whenever ATM node 40 needs to send digital dat to ATM node 50, then the DTU need only have an initial transport label TL1 for the digital data to arrive a ATM node 50.

It should be noted that service labels used for connections between ATM nodes may be released when a connection is terminated. Once a connection is terminated, a release PDU, also a control DTU similar to the setup and response DTUS or other types of DTUS, is sent to each ATM node affected by the terminated connection. This release PDU is sent via the dedicated control channels to the ATM nodes. When received, the release PDU instructs the ATM node to release the service labels associated with a specific connection. In the example given above, if the connection x.y is terminated, then service labels Y and Z are released. These two service labels can then be used by other ATM nodes for their connections. A release PDU may be generated by events other than a connection termination. As an example, if a fault at either end of a connection occurs, this can trigger a release PDU for all ATM nodes affected. It should be noted that local faults generated at an ATM node may also trigger such a release of service labels.

Figure 5:
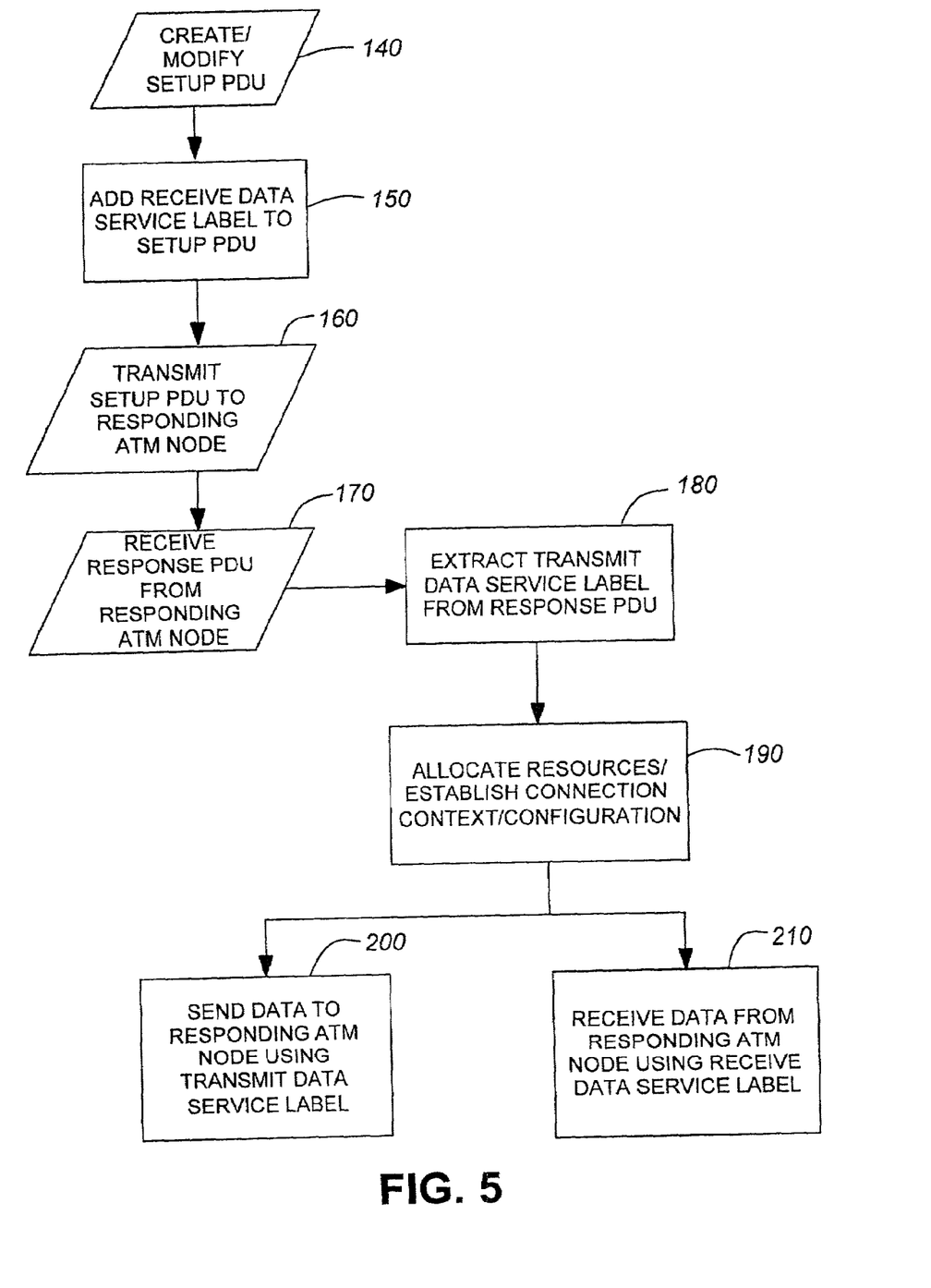
FIG. 5 is a flow chart detailing the steps executed by an initiating ATM node when initiating a data transfer connection with a responding ATM node.

Referring to FIG. 5, illustrated is a flow chart detailing the steps taken by a initiating ATM node that initiates a connection with a responding ATM node. The process begins with the initiating ATM node creating or modifying a setup PDU in step 140. Step 150 consists of the initiating ATM node adding a receive data service label to the setup PDU. This receive data service label is to be used by the responding ATM node when transmitting data to the initiating ATM node. It should be noted that the bidirectional channel to be set up between the initiating ATM node and the responding ATM node is for one specific connection.

After the receive data service label is incorporated into the setup PDU, the initiating ATM node transmits the setup PDU to the responding ATM node in step 160. This is done using predefined control channel service labels and transport labels. After transmitting the setup PDU to the responding ATM node, the initiating ATM node then waits for a response PDU from the responding ATM node. This response PDU serves as acknowledgement from the responding ATM node that the setup PDU has been received and its commands have been executed. The initiating ATM node thus receives the response PDU from the responding ATM node in step 170. Again, this step is executed using predefined control channel service labels and transport labels. In step 180, the initiating ATM node then extracts a transmit data service label from the response PDU. This transmit data service label is to be used by the initiating ATM node when transmitting data to the responding ATM node for the particular connection being set up.

With the transmit data service label having been received by the initiating ATM node, the connection is finally established by allocating the resources and to establish the configuration connection based on information contained in the response PDU (step 190). This step may include such processes as allocating bandwidth for the particular connection and allocating the receive transmit data service label for any data to be sent to the responding ATM node. It should be clear that, prior to step 190, the forwarding and/or processing of other PDUs may be accomplished before the ATM call establishment is completed.

Once the channel has been set up, either step 200 or step 210 is executed. In step 200, the initiating ATM node transmits data to the responding ATM transmit node using the transmit data service label that was received through the response PDU. Alternatively, in step 210 the initiating ATM node receives data from the responding ATM node with the receive data service label attached to the data. It should be clear that either of these steps can be executed concurrently or simultaneously by the initiating ATM node given that step 200 is executed for the data channel for data travelling from the initiating ATM node to the responding ATM node, while step 210 is for the channel for data travelling from the responding ATM node to the initiating ATM node.

It should be noted that the steps in the flow chart in FIG. 5 is executed by the initiating ATM node when establishing a connection with a responding ATM transmit node. The responding ATM node executes a similar sequence of steps to those illustrated in FIG. 5. These steps are illustrated in FIG. 6.

Figure 6:
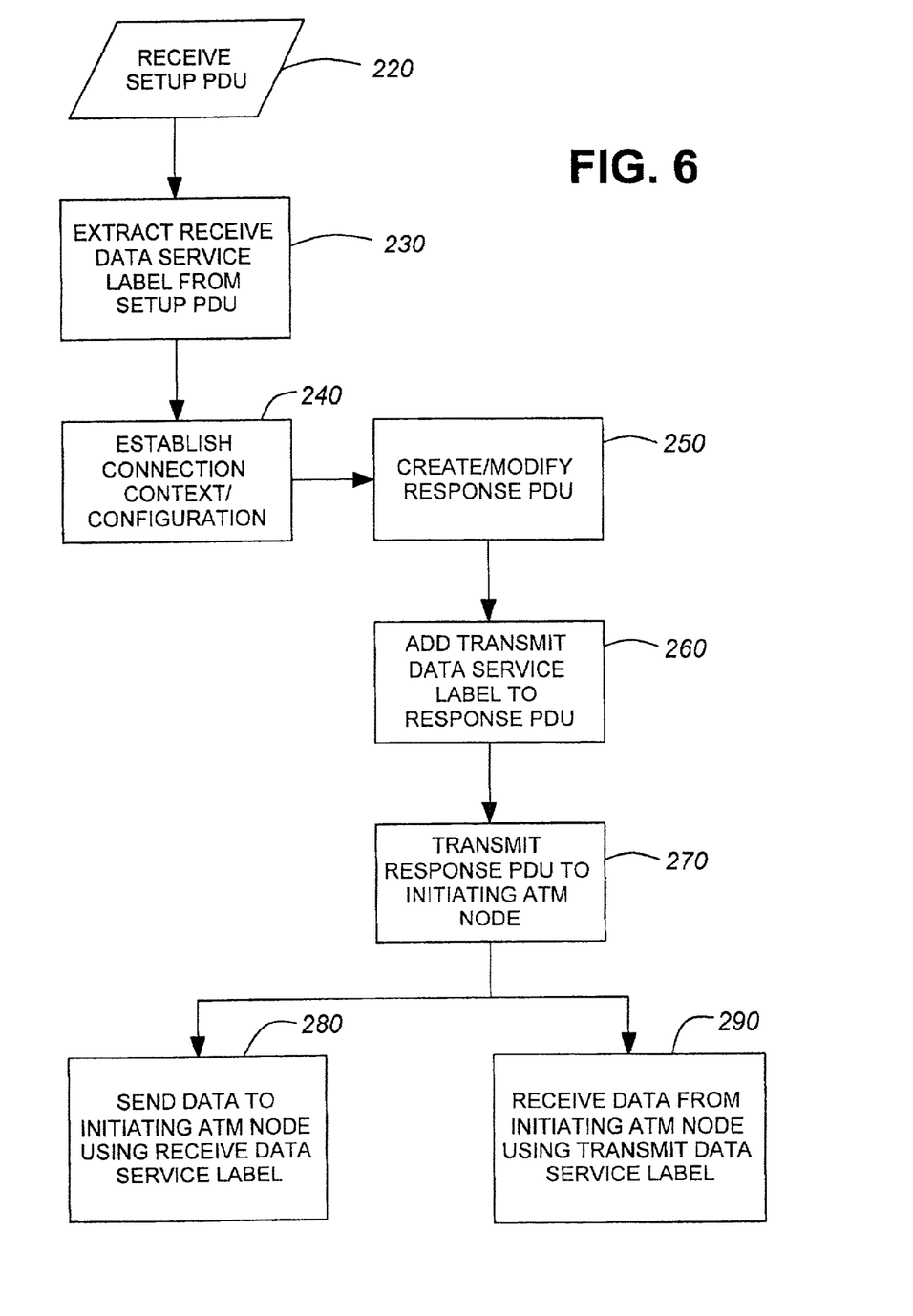
FIG. 6 is a flow chart detailing the steps executed by a responding ATM node when responding to a setup PDU from an initiating ATM node.

Referring to FIG. 6, the process followed by the responding ATM node begins with step 220. This step involves receiving the setup PDU from the initiating ATM node using the predefined control channel service label and transport label. The receive data service label is then extracted (step 230) from the setup PDU. If required, the setup configuration can be forwarded to the initiating node after step 230. This can only be done after the transport data service label is known. Step 240 is establishing the connection content or configuration specific connection as indicated by data included in the setup PDU. This step includes allocating any resources that need to be allocated and determining how incoming packets on the connection being setup is to be processed. In step 250, the responding PDU creates a response PDU that will be transmitted to the initiating ATM node. Step 260 adds a transmit data service label to the response PDU. This transmit data service label will be expected by the responding ATM node from data travelling from the initiating ATM node on the connection currently being established. In step 270 the response PDU is transmitted to the initiating ATM node using predefined control channel service labels and transport labels. With the response PDU transmitted, the forwarding and processing of other PDUs to complete the ATM call establishment can be accomplished. The next step can be either of step 280 or step 290. Step 280 sends data to the initiating ATM node using the received data service label extracted from the setup PDU. In step 290, data is received data from the initiating ATM node using the transmit data service label that was transmitted to the initiating ATM node using the response PDU.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiment of the invention may be implemented as a combination of both software (e.g. a computer program product) and hardware. Still other embodiments of the invention may be implemented as entirely hardware, or entirely software (e.g. a computer program product).

Furthermore it should be clear that while the ATM nodes in the Figures are located at the edges of the MPLS domain, these nodes may, be placed within the MPLS domain in an implementation of the invention.

Figure 7:
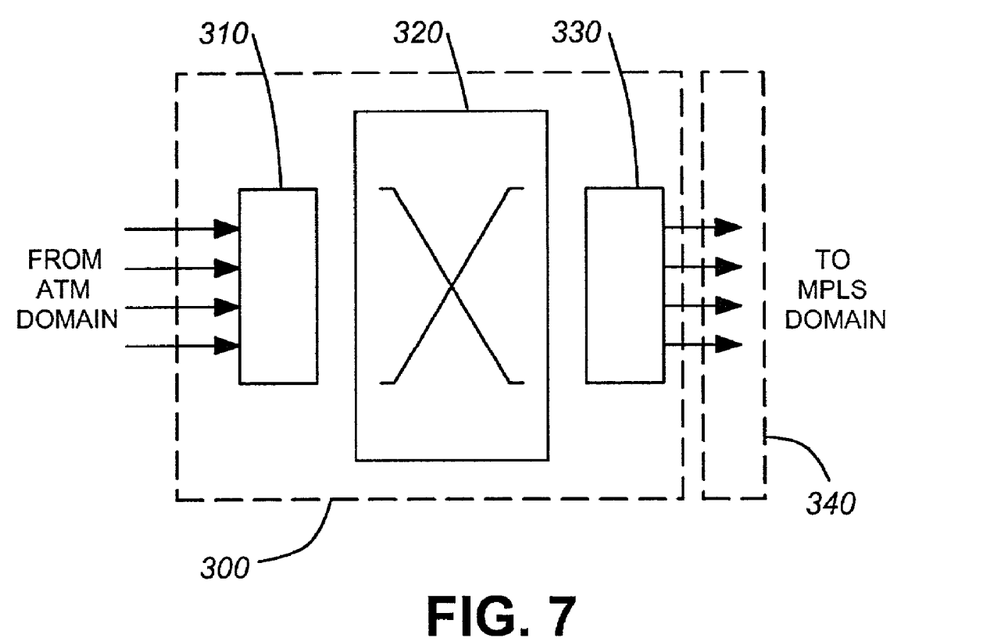
FIG. 7 is a block diagram of an ATM switch which incorporates an embodiment of the invention.

Referring to FIG. 7, a block diagram of an ATM switch which may use the invention. As noted above, the ATM nodes in FIG. 1 are on the edges of an MPLS domain. These ATM nodes can take the form of ATM switches which interface between the MPLS domain and an ATM domain. Suitable ATM switches which may use the invention include the Nortel Networks Passport line of switches including the Passport 15000 line of multi-functional switches.

As can be seen in FIG. 7, the ATM switch 300 has three main components: an input module 310, a switch core 320, and an output module 330. The input module 310 receives DTUS from the ATM domain. The switch core 320 then switches these DTUS to the proper egress ports on the output module 330. Prior to the ATM DTUS being transmitted to the MPLS domain, it should be clear that the transport of these ATM DTUS across the MPLS domain needs to be provisioned. It is at this point that the ATM switch implements the invention as explained above. The implementation can be carried out by the output module 330 prior to transmitting the ATM DTUS across the MPLS domain. Alternatively, an extra MPLS module 340 may be provided between the output module would process the ATM DTUS and ensure that such ATM DTUS are properly encapsulated in an MPLS DTU that has the format illustrated in FIG. 3. Furthermore, such an MPLS module would ensure that the MPLS transport of the ATM DTUS is properly provisioned. To this end, the MPLS module would handle the signalling and service label provisioning between the ATM switch it is attached to and the ATM switch at the other edge of the MPLS domain. The MPLS module would therefore perform the processing, signalling, encapsulation, and service label allocation that are outlined above.

A person understanding the above-described invention may now conceive of alternative designs, using the principles described herein. All such designs which fall within the scope of the claims appended hereto are considered to be part of the present invention.

We claim:

1. A method of establishing a data transfer connection between a first node and a second node across a domain which only allows unidirectional data flow, the method comprising:

a) sending a setup message from the first node to the second node, said setup message containing a first connection service label for a backward direction of data flow, said backward direction being from said second node to said first node;

b) receiving said setup message at said second node and reserving said first connection service label for data being sent from said second node to said first node;

c) sending a response message from the second node to the first node, said response message containing a second connection service label for a forward direction of data flow, said forward direction being from said second node to said first node; and d) receiving said response message at said first node and reserving said second connection service label for data being sent from said first node to said second node, wherein for forward data transmission in said forward direction, data packets for said forward data transmission will be labelled with said second connection service label and for a backward data transmission in said backward direction, data packets for said backward data transmission will be labelled with said first connection service label.

2. A method as in claim 1 wherein nodes in said domain implement a specific unidirectional protocol.

3. A method as in claim 2 wherein said protocol routes data transfer units based on at least one transport label carried by said units.

4. A method as in claim 1 wherein said setup message is labeled with a first predetermined control service label control messages being sent in said forward direction.

5. A method as in claim 4 wherein said response messages is labeled with a second predetermined control service label for control messages being sent in said backward direction.

6. A first network switch for bridging between a first domain which only allows unidirectional flow and a second domain, the first switch including:

a first module for transmitting or receiving first data transmission units to or from the second domain;

a second module for transmitting or receiving second data transmission units to or from the first domain;

a switch core module placed between the first and second modules for switching data between the first and second modules, wherein the first network switch executes computer readable and computer executable instructions for implementing a method for establishing a data transfer connection between the first network switch and a second network switch across the first domain, the method including:

a) sending a setup message from the first network switch to the second network switch, said setup message containing a first connection service label for a backward direction of data flow, said backward direction being from said second network switch to said first network switch;

b) receiving a response message from the second network switch, the response message containing a second connection service label for a forward direction of data flow, the forward direction being from the second switch to the first switch and reserving said second connection service label for data being sent from said first switch to said second switch, such that for forward data transmission in said forward direction, data packets for said forward data transmission will be labeled with said second connection service label and for a backward data transmission in said backward direction, data packets for said backward data transmission will be labeled with said first connection service label.

7. A switch as in claim 6 wherein nodes in said first domain implement a specific unidirectional protocol.

8. A switch as in claim 7 wherein said protocol routes data transfer units based on at least one transport label carried by said units.

9. A switch as in claim 6 wherein said setup message is labelled with a first predetermined control service label control messages being sent in said forward direction.

10. A switch as in claim 9 wherein said response messages is labeled with a second predetermined control service label for control messages being sent in said backward direction.

11. A switch as in claim 6 wherein the first domain is an MPLS (Multi-Protocol Label Switched) domain and the second domain is an ATM domain.

* * * * *

UNITED STATES PATENT AND TRADEMARK OFFICE
CERTIFICATE OF CORRECTION

| | | |
|---|---|---|
| PATENT NO. | : 7,099,334 B2 | Page 1 of 1 |
| APPLICATION NO. | : 10/028791 | |
| DATED | : August 29, 2006 | |
| INVENTOR(S) | : Newell et al. | |

It is certified that error appears in the above-identified patent and that said Letters Patent is hereby corrected as shown below:

Title Page;

On the Face Page, in Field (73), under "Assignee", in Column 1, Line 1, delete "St. Laurent" and insert -- St. Laurent, Quebec, --, therefor.

On the Face Page, in Field (56), under "U.S. PATENT DOCUMENTS", in Column 2, Line 2, delete "2002/0136226 A1*" and insert -- 2002/0136223 A1* --, therefor.

In Column 9, Line 5, delete "digital dat" and insert -- digital data --, therefor.

Signed and Sealed this

Twenty-third Day of August, 2011

David J. Kappos
*Director of the United States Patent and Trademark Office*